US011700514B2

(12) United States Patent
Alieiev et al.

(10) Patent No.: US 11,700,514 B2
(45) Date of Patent: Jul. 11, 2023

(54) METHOD FOR A WIRELESS COMMUNICATION FROM A FIRST TRANSPORTATION VEHICLE TO A ROAD INFRASTRUCTURE STATION AND APPARATUS FOR USE IN A TRANSPORTATION VEHICLE AND ADAPTED TRANSPORTATION VEHICLE

(71) Applicants: VOLKSWAGEN AKTIENGESELLSCHAFT, Wolfsburg (DE); MAN TRUCK & BUS SE, Munich (DE)

(72) Inventors: Roman Alieiev, Stendal (DE); Daniel Reimann, Braunschweig (DE); Teodor Buburuzan, Braunschweig (DE); Steffen Schmitz, Wesel (DE)

(73) Assignee: Volkswagen Aktiengesellschaft ( * ) Notice: Subject to any disclaimer, the term of this patent is extended or adjusted under 35 U.S.C. 154(b) by 690 days.

(21) Appl. No.: 16/775,872

(22) Filed: Jan. 29, 2020

(65) Prior Publication Data
US 2020/0252769 A1    Aug. 6, 2020

(30) Foreign Application Priority Data

Feb. 1, 2019  (EP) .................................... 19155011

(51) Int. Cl.
H04W 4/44       (2018.01)
H04W 4/42       (2018.01)
(Continued)

(52) U.S. Cl.
CPC .......... H04W 4/44 (2018.02); G01C 21/3691 (2013.01); H04W 4/42 (2018.02); H04W 16/28 (2013.01); H04W 64/00 (2013.01)

(58) Field of Classification Search
CPC ......... H04W 4/44; H04W 4/42; H04W 16/28; H04W 64/00; H04W 4/46; H04W 4/40; H04W 4/025; H04W 4/06; G01C 21/3691
See application file for complete search history.

(56) References Cited

U.S. PATENT DOCUMENTS 8,908,516 B2 * 12/2014 Tzamaloukas .......... H04L 47/10
                                                            370/232
10,925,071 B2   2/2021 Hehn et al.
(Continued)

FOREIGN PATENT DOCUMENTS

CN    108337662 A    7/2018
WO    2016051343 A1  4/2016
(Continued)

OTHER PUBLICATIONS

Fazio et al.; A New Interference Aware on Demand Routing Protocol for Vehicular Networks; International Symposium on Performance Evaluation of Computer & Telecommunication Systems (SPECTS); Jun. 27, 2011; pp. 98-103.
(Continued)

Primary Examiner — Margaret G Mastrodonato
(74) Attorney, Agent, or Firm — Barnes & Thornburg, LLP

(57) ABSTRACT

A method for a wireless communication from a first transportation vehicle to a road infrastructure station including determining the position of the first transportation vehicle, determining the distance of the transportation vehicle to the road infrastructure station, calculating a table containing predicted positions in space and/or time for the first transportation vehicle indicating the respective planned transmission characteristics for the future signal transmissions from the first transportation vehicle to the road infrastructure station at the predicted positions, transmitting the table to the surrounding transportation vehicle or to a network manage-
(Continued)

ment station, evaluating the table in the surrounding transportation vehicle or the network management station, and adjusting the transmissions from the surrounding mobile station so that interference between the planned signal transmissions of the first transportation vehicle and the surrounding mobile station is reduced.

20 Claims, 4 Drawing Sheets

(51) Int. Cl.
*G01C 21/36* (2006.01)
*H04W 16/28* (2009.01)
*H04W 64/00* (2009.01)

(56) References Cited

U.S. PATENT DOCUMENTS

| | | |
|---|---|---|
| 2001/0019307 A1 | 9/2001 | Sato et al. |
| 2015/0230188 A1* | 8/2015 | Festag ................ H04W 52/242 370/252 |
| 2017/0208560 A1 | 7/2017 | Papa et al. |
| 2017/0330462 A1 | 11/2017 | Serrano et al. |
| 2018/0075746 A1* | 3/2018 | Jiang .................... H04B 7/0617 |
| 2018/0302280 A1* | 10/2018 | Jiang ....................... H04W 4/02 |
| 2019/0204108 A1* | 7/2019 | Benincasa .............. G08G 1/167 |
| 2019/0293748 A1* | 9/2019 | Gulati ................. H04W 74/004 |
| 2019/0380121 A1* | 12/2019 | Wu ....................... H04W 36/32 |
| 2021/0266715 A1* | 8/2021 | Uchiyama ............. H04W 4/021 |

FOREIGN PATENT DOCUMENTS

| | | |
|---|---|---|
| WO | 2016120236 A1 | 8/2016 |
| WO | 2018054498 A1 | 3/2018 |
| WO | 2018182696 A1 | 10/2018 |
| WO | 2018182706 A1 | 10/2018 |

OTHER PUBLICATIONS

Search Report for European Patent Application No. 19155011.0; dated Jul. 19, 2019.

* cited by examiner

METHOD FOR A WIRELESS COMMUNICATION FROM A FIRST TRANSPORTATION VEHICLE TO A ROAD INFRASTRUCTURE STATION AND APPARATUS FOR USE IN A TRANSPORTATION VEHICLE AND ADAPTED TRANSPORTATION VEHICLE

PRIORITY CLAIM

This patent application claims priority to European Patent Application No. 19155011.0, filed 1 Feb. 2019, the disclosure of which is incorporated herein by reference in its entirety.

SUMMARY

Illustrative embodiments relate to a method for a wireless communication from a first transportation vehicle to a road infrastructure station. Illustrative embodiments further relate to a an apparatus adapted for the use in a transportation vehicle and a transportation vehicle comprising such apparatus.

BRIEF DESCRIPTION OF THE DRAWINGS

An exemplary embodiment is shown in the drawing and is explained in greater detail in the following description. In the drawings.

DETAILED DESCRIPTION

Figure 1:
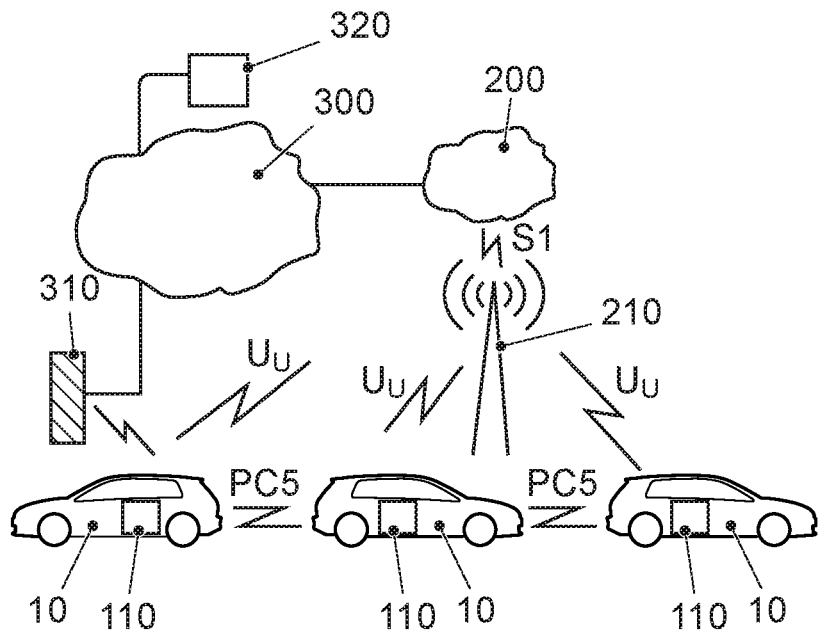
FIG. 1 shows the principle of V2V communication and V2X communication.

For the scenario of transportation vehicles equipped with wireless communication modules a general form of transportation vehicle communication is abbreviated V2X communication corresponding to vehicle-to-everything communication. This means any communication involving a transportation vehicle as a source or destination of a message. Depending on the nature of the other communication endpoint, several special cases exist: Vehicle-to-Vehicle communication (V2V), Vehicle-to-Infrastructure communication (V2I) (road infrastructure stations), which may or may not be co-located with cellular infrastructure, Vehicle-to-Network communication (V2N) (e.g., to a backend server in the Internet), Vehicle-to-Pedestrian communication (V2P). For the scenario of transportation vehicles that communicate directly with each other on public roads with V2V communication, either for a cooperative or autonomous driving scenario, a very high reliability is very important.

Techniques for V2V communication have been developed and will be further developed. As an example the direct transportation vehicle communication via WLAN is mentioned. Especially the variant according to the WLAN standard IEEE 802.11p is suitable for this purpose. For communication between transportation vehicles ad hoc wireless networks are set up (Communication in the "Ad Hoc domain") according to this technique.

But also transportation vehicle communication is possible in the field of cellular networks. In this technique, however, the base station needs to convey the messages from transportation vehicle to transportation vehicle. This is the area where the communication in the so-called "Infrastructure domain" takes place. For the next generation of mobile communications, the cellular vehicle-to-vehicle direct communication (c-V2X) is made possible. When Long Term Evolution (LTE) technology is concerned, this variant was added to Release 14 of the LTE Standard. For the newly developed 5G mobile communication system c-V2X communication is also made possible. The corresponding interface is called PC5 interface.

Typical communication scenarios are safety scenarios, traffic efficiency and infotainment scenarios. In the safety area, typical example scenarios are called: "Cooperative Forward Collision Warning", "Pre-Crash Sensing/Warning", "Hazardous Location Warning". In these areas, the transportation vehicles will exchange information with each other, such as position, movement direction and speed, and parameters such as size and weight. Other information important for the transfer is, e.g., intent information, such as "vehicle intends to overtake", "vehicle turns left/right", and so forth that are interesting for the cooperative driving. Here, often sensor data are transferred. If a hazard is present and the driver does not react, the car could automatically slow down, so that an accident is prevented or at least the consequences of the inevitable accident are minimized.

In the field of traffic management it is mentioned: "Enhanced Route Guidance and Navigation", "Green-Light Optimal Speed Advisory", "V2V Merging Assistance" and "Platooning" as examples. Platooning is understood to be the intelligent driving of a group of transportation vehicles in a convoy as an application, which is also known as "high density platooning". In this case, the distances between the transportation vehicles of the column are controlled, e.g., trucks in the respective traffic situation. The aim is to reduce the distance between the column transportation vehicles as much as possible to reduce energy consumption. In the area of "platooning", it is planned, for example, a reporting back of information about an intended braking maneuver from front to back to avoid rear-end collisions. To this end, messages must be constantly exchanged between the column transportation vehicles.

In the field of Infotainment Internet access is most important for a plurality of multimedia services.

The listing shows that in the safety field time-critical data transmissions take place. Therefore, the latency of the vehicle-to-vehicle communication is crucial. Latency refers to the facet of the timely transmission of the data. The data must arrive at the receiver early enough so that they may still be processed and the receiver can react accordingly.

In mobile communications, the presence of interference of one communication process on another has a critical impact on communication performance. Within V2V communication this problem is even more pronounced due to the fact that most of the communicating partners are usually located on the same road in close proximity. Interference occurs if two or more signal transmissions are simultaneously performed and the signal strength is high enough that by the superposition of the signals at the receiver location the signal is falsified such that the transported data cannot be retrieved despite of the application of error detection and error correction codes. Therefore, there is a need for enhanced solutions to avoid interference.

In some situations, however, the probability for interferences is subjectively increased. In the surroundings of road infrastructure stations there exists a higher interference risk. This is understood if one bears in mind, that V2V-communication and V2I-communication may be performed in the same frequency band which is the 5 GHz band for LTE communication. One example of V2I communication is the communication to a tolling station. The corresponding ETSI standard ETSI TS 102 792 V1.2.1 (2015-06) is titled "Intelligent Transport Systems (ITS); Mitigation techniques to avoid interference between European CEN Dedicated Short Range Communication (CEN DSRC) equipment and Intelligent Transport Systems (ITS) operating in the 5 GHz frequency range". In this standard it is defined that the V2I-communication frequency band is from 5 855 MHz to 5 925 MHz (ITS-G5A/B/D band). But also V2V-communication systems, namely 3GPP via the LTE-V2X PC5 interface (also known as LTE side-link) or IEEE 802.11p, both are operating in the 5.9 GHz band for the provision of direct communications between road users. Thus in the surroundings of such road infrastructure stations interferences may likely occur.

The ETSI standard ETSI TS 102 792 V1.2.1 (2015-06) defines a protected zone around a road infrastructure station such as a tolling station (CEN DSRC) and specifies that an ITS station (transportation vehicle) in the protected zone shall operate in the so-called coexistence mode. In coexistence mode additional restrictions for the signal transmissions apply. These restrictions apply to output power level, unwanted emissions and transmit timing. The restrictions are designed to decrease the interference from ITS stations to a level which implies no harmful performance degradation of CEN DSRC based toll stations.

One known technique to reduce the impact of interference corresponds to the idea of reducing the area in space where the signal is distributed. The known approaches for it are the use of the Multiple Input Multiple Output (MIMO) antenna technique coupled with orthogonal channel components (special multiplexing, multiuser MIMO), beamforming (to form the beam in a known direction and to minimize the side lobes in the direction of other users) or via the use of knowledge about the special distribution of the signal in a given area (special frequency reuse).

WO 2016/120236 A1 corresponds to an example where the beamforming technique is used for the purpose to adapt the emission field of at least one transmission antenna in such a manner that a field strength of the electromagnetic waves is concentrated to the direction the transportation vehicle is moving on the road. Both partner stations transmitting station and receiving station are transportation vehicles equipped with radio communication modules, the technique is therefore used for V2V communication.

From WO 2016/051343 A1 systems and methods for interference and/or power reduction for multiple relay pairs are known using cooperative beamforming techniques. In a cellular communication system the method includes determining beamforming weights for multiple sub channels for each of multiple relay nodes such that a parameter is minimized.

From WO 2018/054498 A1 a wireless communication system is known in which a radio network node is configured to determine that a wireless communication device is onboard a public transit vehicle. Based on that determination, the radio network node is configured to predict a position of the public transit vehicle, e.g., based on a route schedule of the public transit vehicle and/or positioning measurements received from the public transit vehicle. The radio network node is further configured to control beamforming for the wireless communication device based on the predicted position of the public transit vehicle. In some disclosed embodiments, this controlling comprises performing dynamic beam direction adjustment, as needed to track the transit vehicle's movement.

From US 2001/0019307 A1 an electronic toll collection system and its communication system is known. This system comprises an electromagnetic wave path judgement section which calculates wave paths of direct and reflected waves for the toll collection communication system.

All the aforementioned approaches are very complex and have limited performance in a dynamic vehicular environment with heavy traffic.

There is, therefore, a need for an improved solution to the interference problem which helps to avoid interference in a dynamic vehicular environment with heavy traffic where in parallel to V2V-communications V2I-service communications are going on like the already mentioned toll communication in the same frequency band.

Disclosed embodiments provide a method for adjusting the interference level for a wireless communication from a first transportation vehicle to a road infrastructure station, a corresponding apparatus for the use in the method and an adapted transportation vehicle.

The solution according to the proposal is based on the idea to announce the future positions in time and/or space for the communications of a transportation vehicle to a road infrastructure station to the other road participants and to use a cooperative transmission technique for reducing the interference problem. In at least one disclosed embodiment the method for a wireless communication from a first transportation vehicle to a road infrastructure station comprises the operations of determining the position of the first transportation vehicle, determining the distance of the first transportation vehicle to the road infrastructure station, calculating a table containing predicted positions in space and/or time for the first transportation vehicle indicating the respective planned transmission characteristics for the signal transmissions from the first transportation vehicle to the road infrastructure station at the predicted positions and transmitting the table to the at least one surrounding transportation vehicle. A motion trajectory for the first transportation vehicle may be predicted for determining the future positions. The method moreover comprises an operation of evaluating the table in the surrounding transportation vehicle and adjusting the transmissions characteristics from the surrounding mobile station such that interference between the planned signal transmissions of the first transportation vehicle and the surrounding mobile station is reduced. In a further disclosed embodiment the method comprises transmitting the table to a network management station, and evaluating the table in the network management station. In this disclosed embodiment the network management station will perform the task of adjusting the transmissions from the surrounding mobile station. The proposal has the benefit that the latency of the V2V communications can be maintained in comparison of the proposed solution in the above mentioned ETSI TS 102 792 V1.2.1 (2015-06) standard where in the protected area a significant reduction in signal strength is observed such that the range of the signal transmissions is shortened which may cause the need for repeated transmissions. The first transportation vehicle and at least one surrounding transportation vehicle as well as the road infrastructure station and network management station need to be equipped with a wireless communication module. This can be performed by scheduling the transmissions from the surrounding mobile station relative to the transmissions from the first transportation vehicle such that they do not interfere.

In a further disclosed embodiment the table is transmitted to a road side unit from where it is forwarded to the surrounding transportation vehicles. Since the road side unit may be equipped with more sophisticated and professional components such as transceivers and antennas the range for the signal transmissions from the first transportation vehicle could be easily extended by forwarding them through the road side unit.

In a disclosed embodiment, the table is calculated in a manner such that it comprises entries for the points in time and/or the positions in space the first transportation vehicle plans to make signal transmissions for the communication with the road infrastructure station and/or the beam characteristics of the signal transmissions. This allows the receiving stations to plan the transmissions of surrounding transportation vehicles such that the transmission do not collide with the transmissions from the first transportation vehicle.

If it is unavoidable under timing constraints that simultaneous transmissions occur, it is beneficial to adjust the beam characteristics in direction and/or signal strength such that they do not interfere with the transmissions in the surrounding transportation vehicle. It is therefore a further disclosed embodiment, that the operation of adjusting the transmissions from the surrounding transportation vehicle when performed in the surrounding transportation vehicle comprises adjusting the characteristics of a beam for the signal transmissions from the surrounding transportation vehicle. This may include adjusting the direction of the beam and/or adjusting the signal strength of the beam to avoid interference and/or adjusting the frequency of the signal transmissions.

Another disclosed embodiment concerns the operation performed in the network management station of adjusting the transmission characteristics from a surrounding transportation vehicle. Here, it is beneficial when the adjusting operation comprises scheduling the signal transmissions from the surrounding transportation vehicle such that they do not interfere with the planned signal transmissions from the first transportation vehicle. The scheduling operation is typically performed in a base station of a cellular network. Therefore, such type of scheduler is readily available for an LTE or another mobile communication network.

In the case of centralized networks such as cellular networks with a base station eNodeB being a central entity of a network cell, the problem is minimized by such allocation of available resources that at the same point in time, a slot in a data frame transmitted at a given frequency at a given space may only be scheduled to one communication entity for transmission. On one side, the desired time, frequency and space separation in a dynamic environment is a very challenging task to solve. On the other side, it still limits utilization of the frequency-time resources to only one communication partner over the area where such transmission could cause a significant level of interference.

In at least one disclosed embodiment, the network management station may be part of a mobile communication network base station. In another disclosed embodiment, the network management station may be part of a road side unit.

To detect the position of the road infrastructure station in at least one disclosed embodiment it is beneficial to make use of one or more sensors with which the first transportation vehicle is equipped, in particular, camera sensor, RADAR sensor or LIDAR sensor. The position can be determined by evaluating the sensor data with image processing equipment. Alternatively, the position of a road infrastructure station could be extracted from a map of a navigation system the first transportation vehicle is equipped with and in which the position of the road infrastructure station is recorded.

For an apparatus for the use in a first transportation vehicle it is beneficial that it comprises a localization device configured to determine a position of the first transportation vehicle, a computing unit, and a wireless communication module for wireless communication with a surrounding transportation vehicle, a network management station and a road infrastructure station, wherein the computing unit is configured to determine a distance of the first transportation vehicle to the road infrastructure station and to calculate a table containing predicted positions in space and/or time for a first transportation vehicle indicating the respective planned transmission characteristics for the signal transmissions from the first transportation vehicle to the road infrastructure station at the predicted positions, and wherein the wireless communication module is adapted to transmit the table to a surrounding transportation vehicle, or to a network management station.

It is further beneficial if the localization device is further comprising a sensor, in particular, camera sensor, RADAR sensor or LIDAR sensor for detecting the position of the road infrastructure station and/or a navigation system with a navigation map in which the position of the road infrastructure station is recorded.

Moreover, it is beneficial for the apparatus to further comprise a multi antenna array for adjusting beam characteristics for the signal transmissions for the wireless communication from the first transportation vehicle to the road infrastructure station with the help of a beamforming or beamsteering technique. Such techniques are well suited to redirect the beam such that interferences are avoided.

For a transportation vehicle it is beneficial that it comprises an apparatus according to the proposal.

The present description illustrates the principles of the present disclosure. It will thus be appreciated that those skilled in the art will be able to devise various arrangements that, although not explicitly described or shown herein, embody the principles of the disclosure.

All examples and conditional language recited herein are intended for educational purposes to aid the reader in understanding the principles of the disclosure and the concepts contributed to furthering the art, and are to be construed as being without limitation to such specifically recited examples and conditions.

Moreover, all statements herein reciting principles, facets, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the diagrams presented herein represent conceptual views of illustrative circuitry embodying the principles of the disclosure.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read only memory (ROM) for storing software, random access memory (RAM), and nonvolatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a way for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The disclosure as defined by such claims resides in the fact that the functionalities provided by the various recited methods or mechanisms are combined and brought together in the manner which the claims call for.

FIG. 1 shows the system architecture for the proposal. Reference number 10 denotes a transportation vehicle. The depicted transportation vehicle is exemplified as a passenger car. This is not meant to be limiting, it may be any type of a transportation vehicle. Examples of other types of transportation vehicles are: buses, motorcycles, commercial vehicles, in particular, trucks, agricultural machinery, construction machinery, rail vehicles, etc. The use of the disclosed embodiments would be generally in land transportation vehicles, rail transportation vehicles, watercrafts and aircrafts possible. The transportation vehicle 10 is equipped with an on-board connectivity module 110 including corresponding antenna module such that the transportation vehicle 10 can participate in a form of a mobile communication service. FIG. 1 illustrates that transportation vehicle 10 may transmit and receive signals to and from a base station 210 of a mobile communication service provider.

Such base station 210 may be an eNodeB base station of an LTE (Long Term Evolution) mobile communication service provider. The base station 210 and the corresponding equipment is part of a mobile communication network with a plurality of network cells where each cell is served by one base station 210.

The base station 210 in FIG. 1 is positioned close to a main road on which the transportation vehicles 10 are driving. In the terminology of LTE, a mobile terminal corresponds to a user equipment UE, which allows a user to access network services, connecting to the UTRAN or Evolved-UTRAN via the radio interface. Typically, such user equipment corresponds to a smart phone. Of course, mobile terminals are also used in the transportation vehicles 10. The cars 10 are equipped with the communication module, sometimes called on-board connectivity unit OCU 110. This OCU corresponds to an LTE communication module with which the transportation vehicle 10 can receive mobile data in downstream direction and can send such data in upstream direction. This OCU 110 may further be equipped with a WLAN p module to be able to participate in ad hoc V2X communication mode.

In terms of the LTE mobile communication system, the Evolved UMTS Terrestrial Radio Access Network E-UTRAN of LTE consists of a plurality of eNodeBs, providing the E-UTRA user plane (PDCP/RLC/MAC/PHY) and control plane (RRC) protocol terminations towards the UE. The eNodeBs are interconnected with each other by the so-called X2 interface. The eNodeBs are also connected by the so-called S1 interface to the EPC (Evolved Packet Core) 200, more specifically to the MME (Mobility Management Entity) by the S1-MME and to the Serving Gateway (S-GW) by the S1-U interface.

From this general architecture FIG. 1 shows that eNodeB 210 is connected to the EPC 200 via the S1 interface and that EPC 200 is connected to the Internet 300. A backend server 320 to which the transportation vehicles 10 send messages to and receive messages from is also connected to the Internet 300. In the field of cooperative and autonomous driving the backend server 320 typically is located in a traffic control center. The S1 interface may be reduced to practice with wireless communication technology such as with the help of microwave radio communication by directional antennas or wired communication technology based on fiber cables. Finally, a road infrastructure station 310 is also shown. This may be exemplified by a road-side unit RSU 310. For the ease of implementation, it is considered that all components have assigned an Internet address, typically as an IPv6 address, such that the packets transporting messages between the components can be routed correspondingly.

The various interfaces of the LTE network architecture are standardized. It is referred to the various LTE specifications, which are publicly available for the sake of sufficiently disclosing further implementation details.

Figure 2:
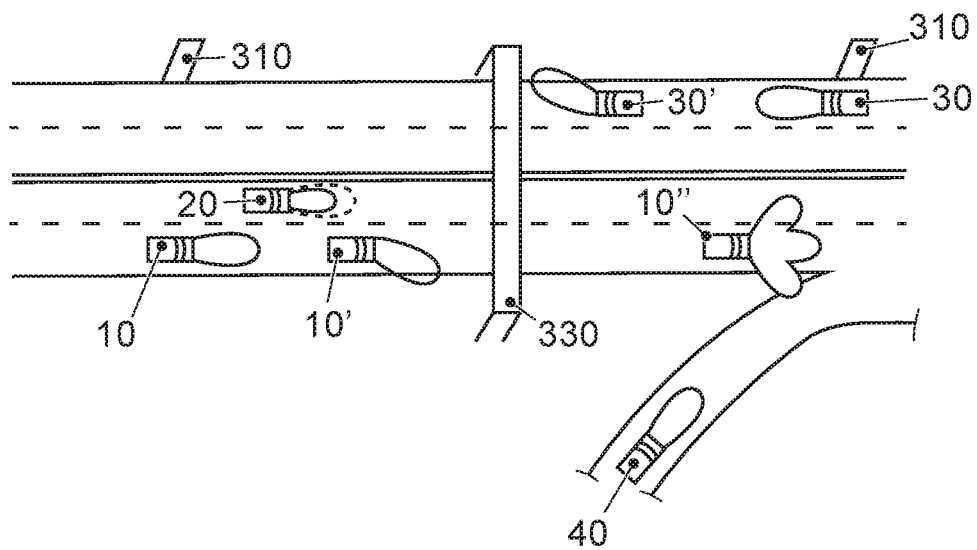
FIG. 2 shows examples of signal transmissions from a first transportation vehicle to a road infrastructure station at different positions and times for transportation vehicles driving on a motorway with two lanes in each direction.

FIG. 2 shows an example of cars communicating in V2V communication mode and cars communicating in V2I communication mode. A first car 10 is driving on the right lane of a road with two lanes for one driving direction. A second car 20 is driving just in front of car 10 on the left lane. A third car 30 is driving in opposite direction on the right lane of the other side of the road. The cars are equipped with a communication module and one or more antenna modules as explained in connection with FIG. 1. There may be transmissions going on also in the rear direction and to the left and right direction of a transportation vehicle. If that is implemented, there may be a need for further antenna modules. All cars are capable of communicating in V2X communication mode including V2V communication mode and a signal transmission is indicated with a lobe in front of each car.

The transmission in front direction usually is performed with greater transmission power and is thus more problematic than the transmission in rear direction in terms of the interference problem. The problem with the transmission in front direction is that the signal range extends much further in the front direction than needed for the successful communication to a direct neighboring car. Thus, the signal transmissions have a much higher range than what is depicted with the lobes in front of the cars. Now FIG. 2 also shows some road infrastructure stations. One example is a road side unit 310 and another example is a toll station 330. In this example the toll station is an automatic toll station which is installed as a bridge over the road. It may be installed in other forms, such as in column form where such column is positioned at one side of the road, only. What the toll station does is communicating with the transportation vehicles passing the toll station 330 to register which route the transportation vehicle took. This information may be sent to a backend server of the toll collection system which evaluates all registrations and calculates the exact fee for the road usage. A corresponding invoice will be sent to the transportation vehicle owner. Since a lot of transportation vehicles passing the toll station 330 need to communicate with the toll station 330, there is a concentration of signal transmissions in the region close to the tolling station 330. In addition, there is ongoing V2V communication in this region, too. If all these communications happen in the same frequency band, there is an even higher risk of disturbances and losses of communication messages thus resulting in the need to repeated transmissions. Of course safety critical transmissions in V2V communication mode have tight latency requirements which could easily be violated due to interference problems.

Figure 3:
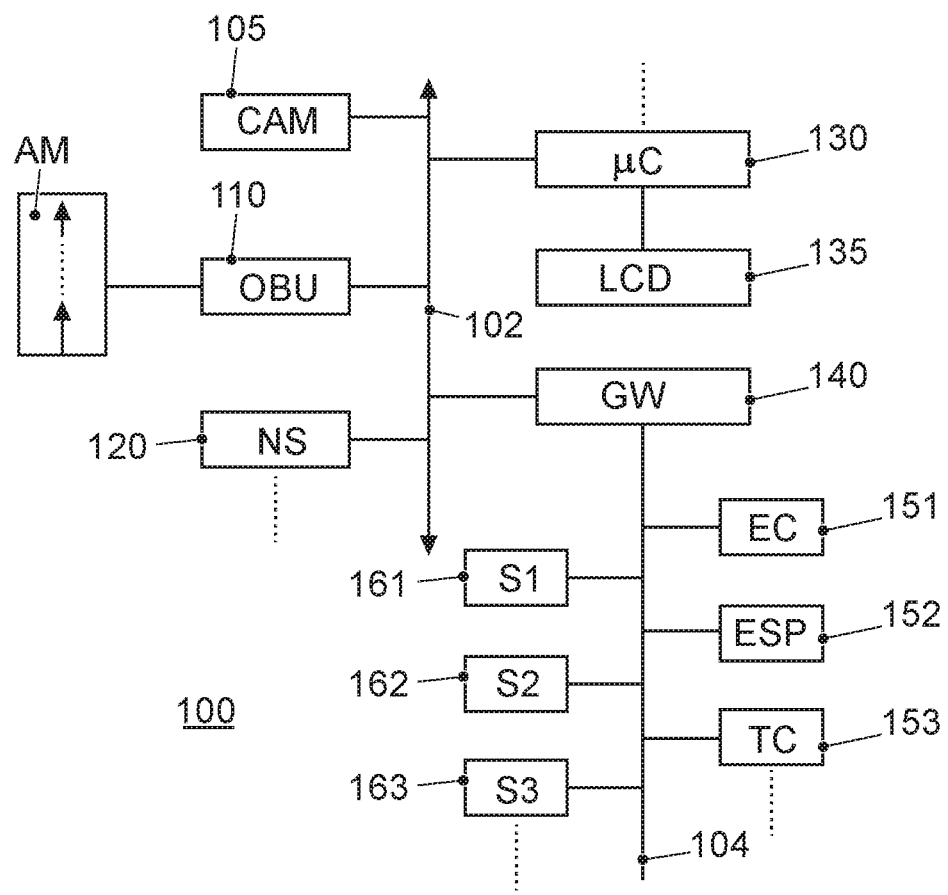
FIG. 3 illustrates a block diagram of car electronics of the first transportation vehicle and a surrounding transportation vehicle.

FIG. 3 illustrates an exemplary block diagram of car electronics of transportation vehicles 10, 20, 30. With reference number 151 an engine control unit is referred. Reference number 152 denotes an anti-slippery control unit including braking control functionality. Further controllers like transmission control unit 153, airbag control etc. are normally available in the car. The linking of such control devices is typically done with the CAN bus system (Controller Area Network) 104 which is standardized as ISO standard, ISO 11898. As various sensors are installed in the transportation vehicle and they are no longer connected only to individual control units, such sensor data is also transmitted via the bus system 104 to the individual control devices. Examples of sensors in the transportation vehicle are wheel speed sensors, steering angle sensors, accelerometers, gyroscopes, tire pressure sensors, proximity sensors, etc. The various sensors, with which the transportation vehicle is equipped, are identified in FIG. 3 by the reference numerals 161, 162, 163.

The modern transportation vehicle can also contain further components such as video cameras, for example, as a front camera and rear camera, or as a driver monitoring camera and a Radar device or Lidar device for the realization of a radar cruise control or for realizing a distance—or collision warning device.

The transportation vehicle may be further equipped with other electronic devices. These are more arranged in the region of the passenger cell and are often operated by the driver. Examples are a user interface device with which the driver selects drive modes, but can also operate classical components. These include gear selection as well as turn signal control, windscreen wiper control, lighting control, etc. With reference number 130 a computing unit is labelled. It is a powerful computing unit which can perform several tasks. One primary task corresponds to the processing of data from surroundings observation sensors such as camera 105. It may process sophisticated image processing algorithms for evaluating the data from surrounding observation sensors. Computing unit 130 is connected to a touch screen LCD display 135 as part of the cars infotainment system.

Part of the infotainment system is a navigation system 120. The position information used in the subject application will be made available by the navigation system 120. Other components, such as a speakerphone may be present but are not shown in detail. Reference numeral 110 denotes the on-board communication module as above mentioned. With the on-board unit 110, an antenna module AM is connected. The antenna module AM has beamsteering and beamforming capability.

The devices of the passenger compartment are also linked to each other via a bus system, which is referred to by the reference numeral 102. This bus system may, for example, be a high-speed Ethernet bus system according to the BroadR-Reach-Technology standard act. For the purpose to submit the transportation vehicle-relevant sensor data from the communication interface 110 to another transportation vehicle or to a central computer, the gateway 140 is provided. This is connected to the two different bus systems 102 and 104. The gateway is designed to convert the data that it receives via the CAN bus 104 into the transmission format of the BroadR-Reach-bus 102 so that they can be distributed in the correspondingly specified packages. For the forwarding of this data to an external device, i.e., to another car, to a road infrastructure station or to a central computer, the on-board communication module 110 is equipped with a BroadR-Reach-bus interface to receive these data packets and in turn put into the transmission format for V2X or V2V communication accordingly.

At least one disclosed embodiment of the proposal how to reduce the interference problem at road infrastructure stations will now be explained in connection with FIG. 4, FIG. 5 and FIG. 6.

Figure 4:
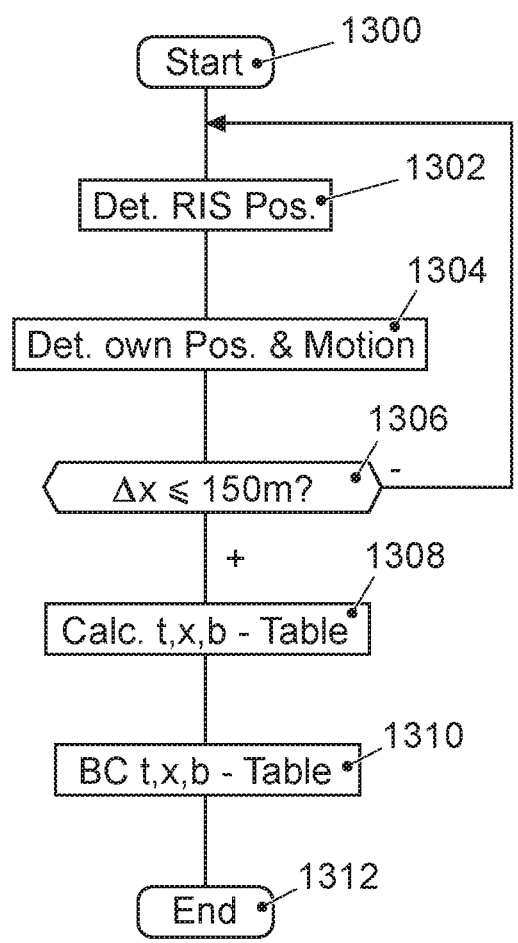
FIG. 4 illustrates a flow chart of a computer program to be executed by a processing unit of the first transportation vehicle.

FIG. 4 depicts a flow diagram of a computer program that runs in the computing unit 130 of the first transportation vehicle 10. Transportation vehicle 10 is driving on the right lane of the road shown in FIG. 2. The program starts in program operation at 1300. In operation at 1302 the position of the toll station 330 is calculated. The start of the program may be triggered by the navigation system 120 which tracks the navigation route. The navigation system 120 will track if the car 10 is approaching a road infrastructure station. For this purpose the fixedly installed road infrastructure stations 310, 330 are recorded in the navigation map. In operation at 1302 the position of the pre-announced road infrastructure station 330 is determined by evaluating the data of camera 105. The distance Δx to the road infrastructure station 330 is determined. It is noted that the position of the road infrastructure station 330 cannot be exactly determined with the navigation map, particularly in cases where due to bad weather conditions or geographical restrictions the satellite signals from the GNSS module cannot be properly received. Therefore, it is beneficial to evaluate the data from the environment observation sensors. In program operation at 1304 the computing unit 130 performs the determination of the own position and the determination of the transportation vehicle speed. In at least one disclosed embodiment the position might be taken from the navigation system 120. In a further disclosed embodiment it may be determined based on an evaluation of the surroundings observation sensors. In the successive program operation at 1306 it will be checked if the distance Δx is below a predetermined distance, in this exemplary embodiment taken to be 150 m. If not, the program branches back to the beginning. If the car 10 is positioned in a distance below 150 m, the program proceeds further with program operation at 1308. In operation at 1308 a so called time space mask will be calculated. The time space mask is used for announcing the signal transmissions from car 10 to the tolling station 330 as far as they can be predicted. The time space mask can be formatted as a table. One example of such a table is presented, here.

TABLE 1

| Time [s] | 0 | 2 | 4 | 6 | 8 | ... | 16 |
|---|---|---|---|---|---|---|---|
| Distance [m] | 0 | 15 | 30 | 45 | 60 | ... | 120 |
| Azimuth θ [°] | 0 | 40 | 20 | 10 | 5 | ... | 0 |

TABLE 1-continued

| Elevation φ [°] | 0 | ±20 | ±15 | ±10 | ±5 | ... | 0 |
|---|---|---|---|---|---|---|---|
| Signal Strength [dBm] | 10 | 12 | 14 | 16 | 18 | ... | 21 |

The values in the table show that the car 10 will adjust the beam characteristics of the signal beam when approaching the tolling station 330. The beam will be lifted upwards when the distance Δx between car 10 and toll station 330 is becoming smaller. This is due to the fact, that the tolling station is installed in the bridge form where the communication equipment is installed in a distance above the road. Of course this is dependent on the tectonics of the landscape the car 10 is driving in. Therefore, it may also be that the beam is steered downwards, if the tolling station 330 is positioned downhill. On one hand beamsteering technology is used here, to lift the beam. The beam can also be steered left and right as indicated with the azimuth angle θ in the table. The last line in the table is an example for the use of beamforming technology. Indicated is the signal strength information, measured in dBm. It may be even more beneficial to use the relative signal strength information with respect to an omnidirectional antenna measured in dBi instead. To variate the signal strength the transmit power control technology may be used as one typical technique. The entries in the table show, that the signal strength is big when the car is in greater distance away from the tolling station. The signal strength will be reduced as long as the transportation vehicle 10 is approaching the tolling station 330.

In operation at 1310 the calculated time space mask is broadcasted to the surrounding transportation vehicles 20, 30. The table set up in the operation at 1308 will be transmitted with the full signal strength such that it reaches the transportation vehicles driving in front of car 10. Also the transportation vehicles driving on the other side of the road should be reached since they will also pass the tolling station 330 in short time. The typical maximum range of the V2V communication is about 1000 m. The program ends in operation at 1312.

FIG. 2 shows two different positions of the first car 10 when passing the tolling station 330. One is close in front of the toll station 330 where the car is labelled 10' and the other behind the toll station 330 where the car is labelled 10". At the position of car 10' it is depicted that the beam is steered upwards to the communication equipment of the toll station 330. It may also be steered to the right. This is beneficial when the tolling station 330 is installed as a column and positioned at the right side of the road. The position of car 10" is close to a place where a merging lane meets the motorway. Here, it is depicted that with beamsteering and beamforming techniques the beam is not only directed in front direction but also to the left and to the right of the car 10". This is indicated by the side lobes of the beam. The reason why the side lobes are present is that the communication with the cars driving on the merging lane should be made possible as fast as possible. Also the communication with cars driving on the left lane should be made possible as fast as possible since it may well be that the first car 10" should change to the fast lane to give room to the cars on the merging lane.

Figure 5:
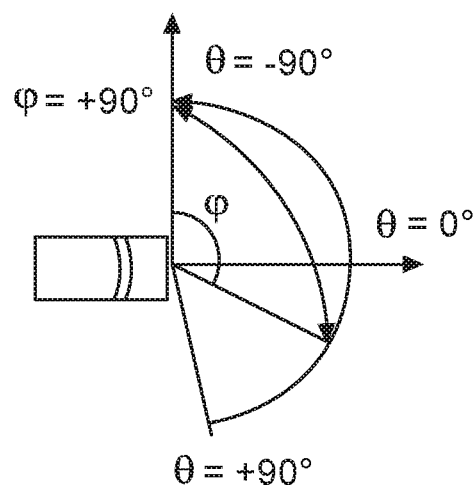
FIG. 5 illustrates the meaning of the azimuth and elevation angles for the beamsteering technology of the first transportation vehicle.

FIG. 5 illustrates the azimuth angle θ and the elevation angle φ for the beamsteering technology in relation to car 10. Not shown are the negative elevation angles but this is only for the ease of understanding the drawing. The beamsteering and beamforming technologies are known and it is referred to the presented patent application documents listed in the introductory part of the application.

Figure 6:
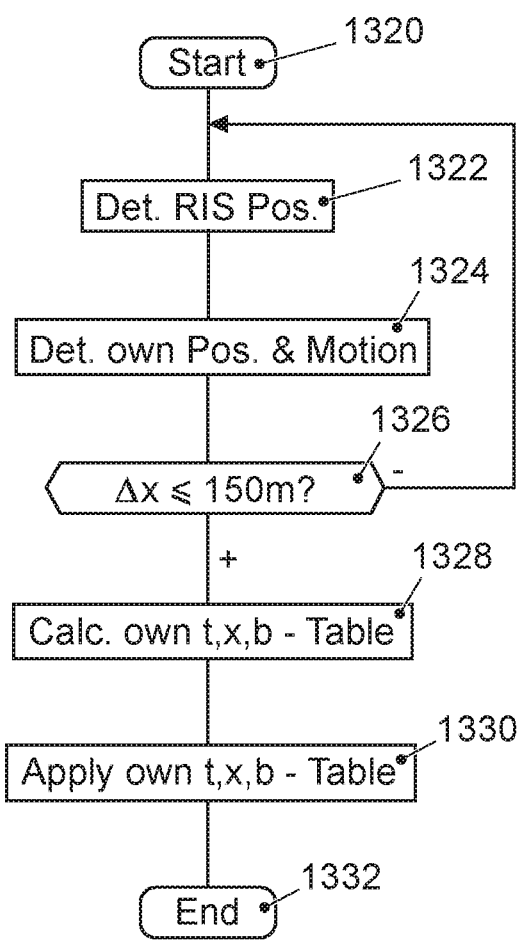
FIG. 6 illustrates a flow chart of a computer program to be executed by a processing unit of the surrounding transportation vehicle.

FIG. 6 now shows what happens in a surrounding car 20, 30 when the time space mask has been received from the first car 10. The reception of the time space mask table triggers the start of a computer program that runs in a computing unit of the surrounding car 20, 30 in operation at 1320. In operation at 1322 the position of the road infrastructure station 330 is determined. This is similar to what happens in operation at 1302 of the program flow chart depicted in FIG. 4. In operation at 1324 the surrounding car 20, 30 determines its own position and determines the own transportation vehicle speed. This is like the operation at 1304 of the program flow chart depicted in FIG. 4. In operation at 1326 the distance to the toll station 330 is calculated. This operation corresponds to the operation at 1306 of the flow chart in FIG. 4. It will also be checked if the transportation vehicle 20, 30 is in a minimum distance of 150 m to the toll station 330. If not, the program branches back to the start of the program. If yes, in operation at 1328 it will evaluate the received time space mask from the first car 10 and calculate its own time space mask for the planned V2V communications. This will be done in the manner such that the interference with the announced predicted signal transmissions of the first car 10 is avoided. In operation at 1330 the calculated time space mask will be applied for its own signal transmissions. The program ends in operation at 1332.

Next a further disclosed embodiment is explained. In that disclosed embodiment the first car 10 again calculates the time space mask as described in connection with FIG. 4. It will not broadcast it via V2V communication but will send it to the eNodeB base station 210 it is logged on. This disclosed embodiment therefore is well suited for the implementation of the cellular V2X communication C-V2X via the PC5 interface, also called sidelink communication. The sidelink communication is characterized that there is a direct communication between the transportation vehicles 10, see FIG. 1 but the base station 210 manages the communication. It is the task of a scheduler located at the base station 210 to manage the V2V communication for the transportation vehicles logged on to the base station. The scheduler will assign transmission resources to each of the transportation vehicles, the transmission resources correspond to resource blocks of the LTE mobile communication system or 5G mobile communication system. When the base station 210 receives the time space mask of first transportation vehicle 10, it will first reserve resources to transportation vehicle 10 according to the entries in time space mask of transportation vehicle 10. If it has received time space masks of a plurality of transportation vehicles, the base station 210 needs to decide which transportation vehicle has priority. The easiest strategy would be to decide based on a First-In-First-Serve principle. The transportation vehicle having sent the first time space mask would get the highest priority according to that principle. The scheduler then would assign resources to the other transportation vehicles. It would do this in a manner that interference problems with the planned V2I communication of transportation vehicle 10 would be avoided. Therefore, it would assign resource blocks with different frequencies and different time slots. This way the signal transmissions for the V2I communication of transportation vehicle 10 would not be disturbed by the V2V communication from the surrounding transportation vehicles 20, 30, 40. In a still further disclosed embodiment also the V2I communication would be scheduled by the base station 210. But since there is likely a concentration of V2V and V2I communication in the vicinity of a road infrastructure station, it would help to announce the planned V2I communication to the base station such that it can take it into account for the scheduling operation. One use case where there will likely be a concentration of V2V and V2I communication in the vicinity of the tolling station 330 is when a platoon of transportation vehicle, e.g., trucks is passing the tolling station 330.

In a still further disclosed embodiment the scheduler would be positioned at a road side unit 310. If it is in a road side unit 310, it would be possible to use it also for V2V communication based on the WLAN p system.

The road side unit 310 could also be used to extend the range for the signal transmissions from transportation vehicle 10 when it broadcasts the time space mask. The road side unit when receiving the time space mask would forward it to surrounding transportation vehicles according to this disclosed embodiment. The side unit could be equipped with more complex antennas and communications system which could use complex mechanisms to extend the communication range.

The first transportation vehicle 10 may thus be configured to execute a method that enables the first transportation vehicle 10 to communicate with a road infrastructure unit 330, e.g., a tolling station, with less interference caused by transmissions of one or more surrounding entities, for example, transportation vehicles 20, 30 and/or road side unit 310. This is useful if such surrounding entities execute wireless communication in a frequency band similar or identical to the frequency band used for the communication from the first transportation vehicle 10 to the road infrastructure station 330. For this purpose, the first transportation vehicle 10 first determines its position, for example, by a suitable sensor. Additionally, the first transportation vehicle 10 determines a distance between the transportation vehicle 10 and a road infrastructure station 330, such as a tolling station. The first transportation vehicle 10 then calculates a table containing future positions of the first transportation vehicle in space and/or time indicating the respective characteristics of a beam for the signal transmissions from the first transportation vehicle 10 to the road infrastructure station 330. The first transportation vehicle 10 then transmits the table, also referred to as time space mask, to its surroundings, either using broadcast or multicast or unicast transmission mode to entities of which it is aware. Surrounding entities include, but are not limited to transportation vehicles, such as transportation vehicles 20, 30 in FIG. 1 and a network management station, such as road side unit 310 in FIG. 2 and base station 210 in FIG. 1.

Applying this method allows the surrounding entities to evaluate the table and adjust their (future) transmissions, by adjustment of one or more transmission characteristics including adjusted scheduling, such that interference between the transmission from the first transportation vehicle 10 to the road infrastructure unit 330 and signal transmissions of the respective surrounding entity is reduced.

For use in such a method, the first transportation vehicle 10 may include an apparatus comprising a localization device, e.g., a sensor 105 or a navigation system 120, configured to determine a position of the first transportation vehicle, a computing unit, e.g., computing unit 130, and a wireless communication module, e.g., on-board communication unit 110. The wireless communication module is configured for wireless communication with surrounding entities, such as surrounding transportation vehicles 20, 30, a base station 210, a road side unit 310 and a road infrastructure station, e.g., a tolling station 130. The positioning device (105; 120) is configured to determine a position of the first transportation vehicle. The computing unit is configured to determine a distance of the first transportation vehicle 10 to the road infrastructure station 330 and to calculate a table containing future positions of the first transportation vehicle 10 in space and/or time indicating the respective transmission characteristics for the signal transmissions from the first transportation vehicle 10 to the road infrastructure station 330. The wireless communication module 110 is configured to transmit the table to a surrounding transportation vehicle 20, 30, or to a network management station, e.g., a base station 210 or a road side unit 310.

The surrounding transportation vehicle 20, 30 may thus be configured to execute a method that enables it to perform wireless communication with reduced interference from a communication between the first transportation vehicle 10 and the road infrastructure unit 330. The surrounding transportation vehicle 20, 30 receives a table containing future positions of the first transportation vehicle 10 in space and/or time indicating respective transmission characteristics for signal transmissions from the first transportation vehicle 10 to the road infrastructure station 330. The surrounding transportation vehicle 20, 30 may then evaluate the table and adjust its transmission characteristics such that interference caused by the communication from the first transportation vehicle 10 to the road infrastructure station 330 on its own wireless signal transmissions is reduced. Such adjustment may include adjusted scheduling.

For use in such a method, the surrounding transportation vehicle 20, 30 may include an apparatus comprising a computing unit, e.g., a computing unit similar to computing unit 130 of the first transportation vehicle 10, and a wireless communication module, e.g., an on-board unit similar to on-board unit 110 of the first transportation vehicle 10. The wireless communication module is configured for wireless communication with surrounding entities, such as first transportation vehicle 10, surrounding transportation vehicles 30, 20, a base station 210, a road side unit 310 and a road infrastructure station, e.g., a tolling station 130. The wireless communication module is configured to receive a table containing predicted future positions of the first transportation vehicle 10 in space and/or time indicating the respective planned transmission characteristics for the signal transmissions from the first transportation vehicle 10 to the road infrastructure station 330 at the future positions. The computing unit is configured to evaluate the table and adjust its transmission characteristics such that interference caused by the communication from the first transportation vehicle 10 to the road infrastructure station 330 has less interference impact on wireless signal transmissions of the surrounding transportation vehicle 20, 30. Such adjustment may include adjusted scheduling.

A network management station, such as a base station 210 or a road side unit 310 with network management capabilities, may be used as well to reduce interference between a communication from a first transportation vehicle 10 and a road infrastructure unit 330 and wireless transmissions from other surrounding transportation vehicles 20, 30. The network management station 210, 310 has the capability of scheduling transmissions for entities that are present in its coverage area. The network management station 210, 310 receives a table containing predicted future positions of the first transportation vehicle 10 in space and/or time indicating respective planned characteristics of a beam for signal transmissions from the first transportation vehicle 10 to the road infrastructure station 330 at the future positions. The network management station 210, 310 further receives requests for planned future transmissions from a surrounding transportation vehicle 20, 30 at predicted future positions. The network management station 210, 310 evaluates the table and schedules the requested transmissions of the surrounding transportation vehicle 20, 30 such that interference caused by the communication from the first transportation vehicle 10 to the road infrastructure station 330 on the wireless signal transmissions of the surrounding transportation vehicle 20, 30 is reduced. The network management station 210, 310 then transmits the scheduled resources to the surrounding transportation vehicle 20, 30 to enable it to perform its requested transmissions using the scheduled resources.

For use in such a method, the network management station 210, 310 may include an apparatus comprising a computing unit, e.g., a computing unit similar to computing unit 130 of the first transportation vehicle 10, a scheduling unit for scheduling wireless transmissions by entities within a coverage area of the network management station 210, 310, and a wireless communication module, e.g., transceiver with similar transmitting and receiving capabilities as the on-board communication unit 110 of the first transportation vehicle 10. The wireless communication module is configured for wireless communication with surrounding entities, such as first transportation vehicle 10, and surrounding transportation vehicles 20, 30, and a road infrastructure station 330, e.g., a tolling station 130. The wireless communication module is configured to receive a table containing predicted future positions of the first transportation vehicle 10 in space and/or time indicating the respective planned transmission characteristics (e.g., beam characteristics) for the signal transmissions from the first transportation vehicle 10 to the road infrastructure station 330 at the predicted positions. The wireless communication module is further configured to receive requests for planned future transmissions from a surrounding transportation vehicle 20, 30. The computing unit is configured to evaluate the table. The scheduling unit is configured to schedule the requested planned transmissions of the surrounding transportation vehicle 20, 30 such that interference caused by the communication from the first transportation vehicle 10 to the road infrastructure station 330 on the wireless signal transmissions of the surrounding transportation vehicle 20, 30 is reduced. The scheduling unit takes the table into account to achieve this. The wireless communication module then transmits the scheduled resources to the surrounding transportation vehicle 20, 30 to enable it to perform its requested transmissions using the scheduled resources.

It is to be understood that the proposed method and apparatus may be implemented in various forms of hardware, software, firmware, special purpose processors, or a combination thereof. Special purpose processors may include application specific integrated circuits (ASICs), reduced instruction set computers (RISCs) and/or field programmable gate arrays (FPGAs). Optionally, the proposed method and apparatus is implemented as a combination of hardware and software. Moreover, the software may be implemented as an application program tangibly embodied on a program storage device. The application program may be uploaded to, and executed by, a machine comprising any suitable architecture. Optionally, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof), which is executed via the operating system. In addition, various other peripheral devices may be connected to the computer platform such as an additional data storage device and a printing device.

It should be understood that the elements shown in the figures may be implemented in various forms of hardware, software or combinations thereof. Optionally, these elements are implemented in a combination of hardware and software on one or more appropriately programmed general-purpose devices, which may include a processor, memory and input/output interfaces. Herein, the phrase "coupled" is defined to mean directly connected to or indirectly connected with through one or more intermediate components. Such intermediate components may include both hardware and software based components.

It is to be further understood that, because some of the constituent system components and method operations depicted in the accompanying figures may be implemented in software, the actual connections between the system components (or the process operations) may differ depending upon the manner in which the proposed method and apparatus is programmed. Given the teachings herein, one of ordinary skill in the related art will be able to contemplate these and similar implementations or configurations of the proposed method and apparatus.

The disclosure is not restricted to the exemplary embodiments described here. There is scope for many different adaptations and developments which are also considered to belong to the disclosure.

Further examples of road infrastructure stations are road side units, intelligent traffic signs, traffic observation stations, traffic warning stations such as a trailer positioned in front of a section where road works is going on, etc.

REFERENCE SIGN LIST

10 $1^{st}$ Transportation Vehicle at $1^{st}$ position
10' $1^{st}$ Transportation Vehicle at $2^{nd}$ position
10" $1^{st}$ Transportation Vehicle at $3^{rd}$ position
20 surrounding Transportation Vehicle
30 surrounding Transportation Vehicle
40 surrounding Transportation Vehicle
100 Block Diagram Car Electronics
102 Infotainment CAN-Bus
104 CAN-Bus
110 On-Board Unit
120 Navigation System
130 Computing Unit
135 LCD Touchscreen Display
140 Gateway
151 Engine Control Unit
152 ESP Control Unit
153 Transmission Control Unit
161 Sensor 1
162 Sensor 2
163 Sensor 3
200 EPC
210 Base Station
300 Internet
310 Road Side Unit
320 Backend Server
330 Tolling Station
1300-1312 different program operations of a $1^{st}$ program
1320-1332 different program operations of a $2^{nd}$ program
AM Antenna Module

The invention claimed is:

1. An apparatus for use in a first transportation vehicle, the apparatus comprising:
a localization device to determine a position of the first transportation vehicle;
a computing unit; and
a wireless communication module for wireless communication with a another transportation vehicle, a network management station and a road infrastructure station in surroundings of the first transportation vehicle,
wherein the computing unit determines a distance of the first transportation vehicle to the road infrastructure station and calculates a table containing predicted positions of the first transportation vehicle in space and/or time indicating respective planned transmission characteristics for the signal transmissions from the first transportation vehicle to the road infrastructure station at the first transportation vehicle's predicted positions,
wherein the wireless communication module transmits the table to another transportation vehicle or to a network management station, and
wherein the table includes data for evaluation by surrounding entities to adjust future wireless communication transmissions by adjustment of one or more transmission characteristics such that interference between wireless signal transmission from the first transportation vehicle to the road infrastructure unit and wireless signal transmissions of respective surrounding entities is reduced.

2. The apparatus of claim 1, wherein the localization device comprises a sensor for detecting the position of the road infrastructure station and/or a navigation system in which the position of the road infrastructure station is recorded.

3. The apparatus of claim 1, further comprising a multi antenna array for adjusting beam characteristics for the signal transmissions for the wireless communication from the first transportation vehicle to the road infrastructure station using a beamforming or beamsteering technique.

4. A transportation vehicle comprising the apparatus according to claim 1.

5. The apparatus of claim 1, wherein the table is transmitted to a road side unit which forwards the table to the another transportation vehicle.

6. The apparatus of claim 1, wherein the calculated table comprises entries for points in time and/or positions in space which the first transportation vehicle plans to make signal transmissions for communication with the road infrastructure station and/or beam characteristics of the planned signal transmissions.

7. The apparatus of claim 1, wherein the adjusting of the one or more transmission characteristics includes adjusting the direction of the beam and/or adjusting the signal strength of the beam.

8. The apparatus of claim 1, wherein signal transmission characteristics for signal transmissions from the another transportation vehicle are performed in the another transportation vehicle including adjusting characteristics of a beam for the signal transmissions from the another transportation vehicle.

9. The apparatus of claim 1, wherein the signal transmission characteristics for signal transmissions from the another transportation vehicle are performed in the network management station including scheduling the signal transmissions from the another transportation vehicle so the signal transmissions do not interfere with the planned signal transmissions for the wireless communication from the first transportation vehicle to the road infrastructure station.

10. The apparatus of claim 9, wherein the network management station is part of a mobile communication network base station or a road side unit.

11. The apparatus of claim 1, wherein the position of the road infrastructure station is detected by a sensor with which the first transportation vehicle is equipped and/or by a map of a navigation system with which the first transportation vehicle is equipped and in which the position of the road infrastructure station is recorded.

12. A method for a wireless communication from a first transportation vehicle to a road infrastructure station, the method comprising:
determining a position of the first transportation vehicle;
determining a distance of the first transportation vehicle to the road infrastructure station;
calculating a table containing predicted positions of the first transportation vehicle in space and/or time indicating respective planned transmission characteristics for the signal transmissions from the first transportation vehicle to the road infrastructure station at the predicted positions;
transmitting the table to another transportation vehicle or to a network management station; and
evaluating the table in the surrounding transportation vehicle or the network management station
wherein the table includes data for evaluation by surrounding entities to adjust future wireless communication transmissions by adjustment of one or more transmission characteristics such that interference between wireless signal transmission from the first transportation vehicle to the road infrastructure unit and wireless signal transmissions of respective surrounding entities is reduced.

13. The method of claim 12, wherein the table is transmitted to a road side unit which forwards the table to the another transportation vehicle.

14. The method of claim 12, wherein the calculated table comprises entries for points in time and/or positions in space which the first transportation vehicle plans to make signal transmissions for communication with the road infrastructure station and/or beam characteristics of the planned signal transmissions.

15. The method of claim 12, wherein the adjusting of the one or more transmission characteristics includes adjusting the direction of the beam and/or adjusting the signal strength of the beam.

16. The method of claim 12, wherein signal transmission characteristics for signal transmissions from the another transportation vehicle are performed in the another transportation vehicle including adjusting characteristics of a beam for the signal transmissions from the another transportation vehicle.

17. The method of claim 12, wherein the signal transmission characteristics for signal transmissions from the another transportation vehicle are performed in the network management station including scheduling the signal transmissions from the another transportation vehicle so the signal transmissions do not interfere with the planned signal transmissions for the wireless communication from the first transportation vehicle to the road infrastructure station.

18. The method of claim 17, wherein the network management station is part of a mobile communication network base station or a road side unit.

19. The method of claim 12, wherein the position of the road infrastructure station is detected by a sensor with which the first transportation vehicle is equipped and/or by a map of a navigation system with which the first transportation vehicle is equipped and in which the position of the road infrastructure station is recorded.

20. The method of claim 12, further comprising adjusting transmission characteristics for the signal transmissions from the surrounding transportation vehicle so that interference between the planned signal transmissions for the wireless communication of the first transportation vehicle to the road infrastructure station and signal transmissions of the surrounding transportation vehicle is reduced.

\* \* \* \* \*